Patented Oct. 9, 1951

2,570,495

UNITED STATES PATENT OFFICE 2,570,495

PRODUCTION OF ORGANIC CHLORIDES

Norman D. Scott, Sanborn, N. Y., assignor to E. I.
du Pont de Nemours & Company, Wilmington,
Del., a corporation of Delaware No Drawing. Application August 8, 1946,
Serial No. 689,189

3 Claims. (Cl. 260—657)

This invention relates to the production of organic halides by the reaction of alcohols with hydrogen halides, and to a method which involves the use of new and improved catalysts for that reaction.

One well-known method for preparing organic halides from the corresponding alcohols involves the use of dehydrating agents such as ferric chloride, sulfuric acid, or zinc chloride. Such agents may be used to produce the halides in more or less good yields, but they are objectionable for various reasons including the fact that their use on a manufacturing scale generally necessitates the employment of an excess of the hydrogen halide which excess presents a very troublesome corrosion problem. In some cases the use of agents such as zinc chloride and ferric chloride also cause the formation of substantial quantities of tarry by-products at the temperatures required for conversion at a practical rate and also the formation of other by-products, such as ethers.

It is an object of the present invention to provide an improved method of preparing organic halides, particularly the chlorides and bromides, from the corresponding alcohols. A further object is the provision of a method of preparing such halides employing new and improved catalysts, the use of which makes possible production of the organic chlorides and bromides in a smooth and efficient manner with good yields and with no substantial formation of tars and other objectionable by-products. Other objects will be apparent from the ensuing description.

The above objects are accomplished in accordance with the invention by reacting a monohydric alcohol with hydrogen chloride or bromide in the presence of an amine salt of the type indicated below, the function of the salt being to catalyze the reaction between the alcohol and the hydrogen halide to produce the corresponding organic halide.

The amine salts which are suitable for use as catalysts in accordance with the invention are those compounds of the following general formula:

wherein each R substituent is hydrogen or an alkyl or aralkyl radical, Y is an alkyl radical and X is either chlorine or bromine. The preferred catalysts are those amine salts which are aliphatic compounds, i. e., contain no non-aliphatic radicals, in which each of at least two of the R substituents in the above general formula is an alkyl radical. In other words, the preferred catalysts are the aliphatic tertiary amine hydrochlorides and hydrobromides and the tetraalkyl quaternary ammonium chlorides and bromides. It has been discovered that the above amine salts are outstanding catalysts for the conversion of alcohols to the corresponding chlorides or bromides.

Specific examples of amine salts of the above general formula which are suitable for the present purposes are the hydrochlorides and hydrobromides of the following amines: mono-, di- and tri-alkyl amines having from 1 to 6 carbon atoms, including mixed secondary and tertiary amines such as methylethylamine, methyldiethylamine, methylamylamine and methyldiamylamine. Amines having alkyl groups of higher carbon content such as the decyl and dodecyl groups may also be used, but those amines in which the alkyl groups contain less than 7 carbon atoms will generally find most use because they are more readily available. Branched chain amines may also be used. Other examples of suitable amine hydrohalides are those in which the R substituents in the above formula include at least one alkyl radical in addition to one or two aralkyl radicals such as the hydrochloride of dimethylbenzylamine. Examples of suitable quaternary ammonium salts are tetramethyl ammonium chloride, tetraethyl ammonium chloride and trimethylbenzyl ammonium chloride and the like, especially those in which the alkyl radicals contain not more than 6 carbon atoms, and the corresponding bromides. The preferred tertiary amine hydrohalides and tetraalkyl ammonium halides are illustrated by triamylamine hydrochloride, tetramethyl ammonium chloride, tetraethyl ammonium chloride, and the corresponding bromides.

Any of the monohydric aliphatic or alicyclic alcohols may be employed as starting materials for the production of organic halides in accordance with the invention. Specific examples of such alcohols are methanol, ethanol and the various straight and branched chain propanols, butanols, pentanols, hexanols, and the like. Other higher alcohols such as lauryl alcohol may also be used; likewise the alicyclic alcohols such as cyclohexanol. Best results however are obtained with the lower alcohols, i. e., those containing less than 6 carbon atoms.

The present catalysts may be employed for carrying out the reaction in either the liquid or vapor phase. When employing the vapor phase method, the amine salt may be impregnated on any suitable catalyst carrier such as absorbent carbon or the like by well-known methods. Thus, the support material may be impregnated with a solution of the amine salt, or with the amine after which it may be converted to the salt in place on the support by reaction with the gaseous hydrogen halide. Following the impregnation, the catalyst should be dried at elevated temperatures after which alcohol vapor and the hydrogen halide may be passed over the catalyst.

It is preferred to carry out the reaction in the liquid phase. This may be accomplished by adding suitable quantities of the catalyst to the alcohol and then passing the hydrogen halide into the resulting mixture while maintaining the latter at a suitable reaction temperature. A more practical way is to employ the amine salt in the form of a liquid as the reaction medium into which the alcohol and the hydrogen halide are passed continuously. The reaction medium, of course, should be maintained at a temperature favorable to the reaction and best results are obtained when the reaction temperature is sufficiently high to cause distillation of the product organic halide and water from the reaction medium as they are formed.

The catalyst concentration may be varied considerably and when operating in the liquid phase catalyst concentrations as low as 5% to 10% are effective. However, since concentrations considerably in excess of those amounts give better conversions, it is preferred to use the catalyst in concentrations of 50% or higher based upon the total weight of the liquid reaction medium. When operating in a continuous manner, at a temperature sufficiently high to distil reaction products from the reaction medium as they are formed, the reaction medium will consist almost entirely of the amine salt.

With the use of these catalysts the conversion of the alcohol to the corresponding halide will proceed at temperatures as low as 50° C. However, in general, it will be desirable to maintain a reaction temperature within the range 60 to 200° C. and preferably 115 to 140° C. When employing the vapor phase method somewhat higher temperatures than are optimum for the liquid phase method will generally be desirable.

The reaction in accordance with the invention may be carried out smoothly employing an excess of either of the reactants. It is preferred, however, that equivalent quantities of the reactants or an excess of the alcohol be employed, since under such circumstances substantial quantities of unreacted hydrogen halide in the reaction products are avoided. Preferably, a 10 to 50% molar excess of the alcohol is employed. The presence of substantial quantities of hydrogen halide in the reaction product is generally undesirable since recovery thereof in salable form is not generally practicable. Furthermore, the presence of such an excess presents a very troublesome corrosion problem. When using an excess of the alcohol, the unreacted alcohol may be effectively and conveniently recovered by well-known scrubbing methods and recycled through the reactor so that no substantial loss of alcohol will result.

The invention is further illustrated by the following examples.

*Example 1*

A glass reactor 46 cm. deep and 8 cm. I. D. was equipped with a glass stirrer extending nearly to the bottom, and with two inlet tubes extending into the reactor and ending immediately below the stirrer. The reactor was also provided with a vapor exit tube leading from the top of the reactor to a scrubbing and condensing system. The entire reactor was immersed in an oil bath which was thermostatically controlled to maintain any desired temperature in the reactor.

1000 grams of triamylamine were placed into the reactor into which there was then passed a stream of hydrogen chloride. Passage of the hydrogen chloride was continued while the contents of the reactor were heated gradually until a temperature of 130° C. was reached during which time the contents of the reactor were stirred. By this method of treatment the amine was converted to triamylamine hydrochloride which was liquid at 130° C. As soon as hydrogen chloride began to flow freely from the reactor, equimolar quantities of methanol and hydrogen chloride were fed into the stirred bath of liquid triamylamine hydrochloride which was maintained at 130° C. The conversion of the reactants to methyl chloride which was condensed in the recovery system was approximately 60 to 70% based upon the amount of the reactants fed. The yield of methyl chloride was 97% based upon the reactants consumed. The recovery of methyl chloride corresponded to a space time yield of 152, i. e., a yield of 152 lbs. per cu. ft. of catalyst space per 24 hours. Substantially no dimethyl ether was formed and the reaction medium remained water-white in appearance showing that no substantial quantity of tarry by-products were formed.

*Example 2*

400 grams of a 50% aqueous solution of tetramethyl ammonium chloride were added to a reactor similar to that described in Example 1 except that it was 65 cm. long and 5 cm. I. D. The material was heated with stirring to 130° C. and during the course of 2 hours 2 mols of methanol and 1.2 mols of hydrogen chloride were fed through the charge at uniform rates. The conversions to methyl chloride were 40 and 72% based on methanol and hydrogen chloride, respectively. The yields based on reactants not recovered as such were substantially quantitative. Practically no dimethyl ether was formed and the reaction medium remained water-white.

*Example 3*

A flask fitted with a reflux condenser and an inlet tube was charged with 100 g. of diamylamine and 200 g. or 6.25 mols of methanol. The top of the reflux condenser was connected in series to a water scrubber, a CaCl₂ dryer and a cold temperature condenser and receiver. A slow stream of gaseous hydrogen chloride was passed into the flask until the amine was neutralized. Then the flask was heated gently to reflux while continuing the passage of the gas. After a total period of 2.5 hours passage of the hydrogen chloride was discontinued and the reaction mass was refluxed for 0.5 hour. A total of 115 g. or 2.28 mols of methyl chloride was obtained. The conversion of methanol to methyl chloride was 36.5%. Substantially all of the unreacted methanol was recovered in the scrubbers.

*Example 4*

Into a reaction flask fitted with an inlet tube and provided with a reflux condenser leading to a water scrubber, a CaCl₂ drier and a cold temperature condenser and receiver, there were charged 50 g. of diamylamine and 200 g. or 6.25 mols of methanol. During the course of 2 hours anhydrous hydrogen bromide was passed into the reaction flask at a moderate rate while maintaining the contents of the flask under reflux conditions. There were obtained 3.27 mols of methyl bromide. The conversion of methanol to methyl bromide was 52.3%. Practically all of the unreacted methanol was recovered in the scrubbers. No tar or dimethyl ether formation was noted.

Example 5

Example 4 was repeated except that 50 g. of n-butylamine was used. During 2.5 hours methyl bromide was obtained in an amount corresponding to an 85% conversion based on the methanol. Practically all of the unreacted methanol was recovered in the scrubber. No tar or dimethyl ether formation was noted.

Example 6

Example 4 was repeated using n-butylamine and hydrogen chloride. There was obtained an amount of methyl chloride which corresponded to a conversion of 37.7% of the methanol used. Substantially all of the unreacted methanol was recovered in the water scrubber.

Example 7

A charge of 100 g. of triamylamine and 200 g. of butanol was placed into a reaction flask provided with a reflux condenser and a gas inlet tube extending to near the bottom of the flask. The top of the condenser was connected to a trap and a water scrubbing system. Anhydrous hydrogen chloride was passed into the charge until the amine was neutralized after which passage of the gas was continued until a total of 280 g. were passed while maintaining the contents of the flask at 100–120° C. After 4 hours the contents of the flask were distilled and the fraction boiling below a head temperature of 110° C. was combined with butyl chloride which had been swept from the flask by the excess hydrogen chloride and collected in the scrubbers. From the combined material there was obtained butyl chloride boiling at 78–79° C. in a 32% conversion based on butanol. The yield was substantially quantitative and no tar formation was noted.

Example 8

Example 7 was repeated using 200 g. of amyl alcohol in place of butanol. Amyl chloride was obtained in a 36% conversion based on the alcohol. The yield was substantially quantitative.

Other monochlorides and monobromides may be prepared in the manner illustrated by the above examples with substantially the same results. Such reactions proceed smoothly with good conversions and high yields when employing the present catalysts under the conditions specified herein.

When the liquid phase method is employed, it will be desirable to employ a catalyst which exists as a liquid at the desired reaction temperature. Many of the above catalysts are molten at the preferred temperatures. In those instances where the melting point of the amine salt is higher than the desired reaction temperature, it will generally be desirable to add sufficient water or other suitable solvent to the amine salt to maintain it in the form of a solution or liquid at the desired temperature.

Pressures above or below atmospheric pressure may be employed, but in general good results may be achieved at atmospheric pressure.

The hydrogen chloride or hydrogen bromide is preferably added to the reaction medium in the form of an anhydrous gas although concentrated aqueous solutions thereof may be used if desired. The alcohols may be used either as a liquid or a vapor and when employing the liquid phase continuous method control of the reaction temperature may in part be effected by adding some or all of the alcohol as a liquid.

When employing primary, secondary or tertiary amine hydrogen halides as catalysts and using an excess of the alcohol, there may be a tendency for free amine to be generated in the reaction mixture. This is particularly true when a relatively high temperature, e. g., 140° C. or above, is used. Where the amine is a high boiling compound and is not rapidly removed from the mixture at the temperature of operation, such free amine that may be formed may be reconverted to the hydrogen halide by periodically passing an excess of the hydrogen halide into the reaction mixture.

I claim:

1. A method of producing an organic chloride by reaction of hydrogen chloride with a monohydric alcohol, comprising reacting said alcohol with said hydrogen chloride at a temperature of 60 to 200° C. in the presence of an aliphatic tertiary amine hydrochloride each of whose alkyl groups has not more than 6 carbon atoms as catalyst for said reaction.

2. The method of claim 1 wherein the amine hydrochloride is triamylamine hydrochloride.

3. The method of claim 2 wherein the alcohol is methanol and the reaction is carried out at 115 to 160° C.

NORMAN D. SCOTT.

REFERENCES CITED

The following references are of record in the file of this patent:

UNITED STATES PATENTS

| Number | Name | Date |
| --- | --- | --- |
| 2,168,167 | Leuchs | Aug. 1, 1939 |

FOREIGN PATENTS

| Number | Country | Date |
| --- | --- | --- |
| 624,693 | Germany | Jan. 30, 1936 |